US011393210B2

(12) United States Patent
Felhi et al.

(10) Patent No.: US 11,393,210 B2
(45) Date of Patent: Jul. 19, 2022

(54) GENERATION OF ALERT EVENTS BASED ON A DETECTION OF OBJECTS FROM CAMERA IMAGES

(71) Applicant: NETATMO, Boulogne-Billancourt (FR)

(72) Inventors: Mehdi Felhi, Suresnes (FR); Alice Lebois, Suresnes (FR); Fred Potter, Neuilly-sur-Seine (FR); Florian Deleuil, Paris (FR)

(73) Assignee: NETATMO, Boulogne-Billancourt (FR)

( * ) Notice: Subject to any disclaimer, the term of this patent is extended or adjusted under 35 U.S.C. 154(b) by 0 days.

(21) Appl. No.: 16/617,625

(22) PCT Filed: Jun. 1, 2018

(86) PCT No.: PCT/EP2018/064407
§ 371 (c)(1),
(2) Date: Nov. 27, 2019

(87) PCT Pub. No.: WO2018/220150
PCT Pub. Date: Dec. 6, 2018

(65) Prior Publication Data
US 2020/0184227 A1    Jun. 11, 2020

(30) Foreign Application Priority Data

Jun. 2, 2017    (EP) .................................... 17305658

(51) Int. Cl.
*G06V 20/52*    (2022.01)
*G06T 7/215*    (2017.01)
(Continued)

(52) U.S. Cl.
CPC ............ *G06V 20/52* (2022.01); *G06K 9/6263* (2013.01); *G06K 9/6267* (2013.01); *G06T 7/215* (2017.01);
(Continued)

(58) Field of Classification Search
CPC ............ G06K 9/00771; G06K 9/00228; G06K 9/00295; G06K 9/00362; G06K 9/3233;
(Continued)

(56) References Cited

U.S. PATENT DOCUMENTS

| 7,227,977 | B1 | 6/2007 | Dotsenko | |
|---|---|---|---|---|
| 2008/0037869 | A1* | 2/2008 | Zhou | G06T 7/155 382/173 |
| 2008/0080748 | A1* | 4/2008 | Sukegawa | G06K 9/00885 382/118 |
| 2009/0041297 | A1 | 2/2009 | Zhang et al. | |

(Continued)

FOREIGN PATENT DOCUMENTS

| CN | 101167086 A | 4/2008 |
|---|---|---|
| CN | 101226664 A | 7/2008 |

(Continued)

OTHER PUBLICATIONS

International Search Report for PCT/EP2018/064407, dated Aug. 13, 2018.

(Continued)

*Primary Examiner* — Casey L Kretzer
(74) *Attorney, Agent, or Firm* — Meagher Emanuel Laks Goldberg & Liao, LLP

(57) ABSTRACT

The invention relates to a device that receives images from one or more cameras, process images and automatically detects unknown humans in the field of view of the camera, for example to prevent burglary. In order to do so, the device comprises a processing logic configured to detect faces, recognize faces and verify if a face corresponds to a face in a collection of faces of known humans. If a face is detected, but does not correspond to a known face, an alarm event is triggered. The processing logic is further configured to classify objects in the image in classes of object comprising at least a human class. If a human is recognized, but no face (Continued)

has been detected for this human, an alarm event is also triggered. Thus, an alarm can be triggered in any case wherein a human is detected, which is not a known, trusty human.

12 Claims, 12 Drawing Sheets

(51) Int. Cl.
  *G06K 9/62* (2022.01)
  *G08B 13/196* (2006.01)
  *G06V 10/25* (2022.01)
  *G06V 40/10* (2022.01)
  *G06V 40/16* (2022.01)

(52) U.S. Cl.
  CPC .............. *G06V 10/25* (2022.01); *G06V 40/10* (2022.01); *G06V 40/161* (2022.01); *G06V 40/173* (2022.01); *G08B 13/19608* (2013.01); *G08B 13/19615* (2013.01)

(58) Field of Classification Search
  CPC .... G06K 9/6263; G06K 9/6267; G06T 7/215; G08B 13/19608; G08B 13/19615; G06V 20/52; G06V 10/25; G06V 40/10; G06V 40/161; G06V 40/173
  See application file for complete search history.

(56) References Cited

U.S. PATENT DOCUMENTS

| | | | |
|---|---|---|---|
| 2009/0141969 A1* | 6/2009 | Yu | G06N 3/08 382/157 |
| 2009/0167862 A1 | 7/2009 | Jentoft et al. | |
| 2014/0191948 A1* | 7/2014 | Kim | G06F 3/0483 345/156 |
| 2015/0161451 A1* | 6/2015 | Nye | G06K 9/00771 382/103 |
| 2016/0133122 A1 | 5/2016 | Shizawa et al. | |
| 2016/0227737 A1* | 8/2016 | Dzamba | A01K 5/0225 |
| 2016/0239723 A1 | 8/2016 | Ge | |
| 2016/0335861 A1 | 11/2016 | Shimura | |
| 2018/0268202 A1* | 9/2018 | Yu | G06F 16/71 |

FOREIGN PATENT DOCUMENTS

| | | |
|---|---|---|
| CN | 104657712 A | 5/2015 |
| CN | 105989683 A | 10/2016 |
| CN | 106295470 A | 1/2017 |
| EP | 3159859 A1 | 4/2017 |

OTHER PUBLICATIONS

English Translation of Chinese Office action for corresponing application No. 201880035284.4, dated Jan. 18, 2021.
English Translation of Chinese Office Action for corresponding application No. 201880035284.4, dated Aug. 6, 2021.

* cited by examiner

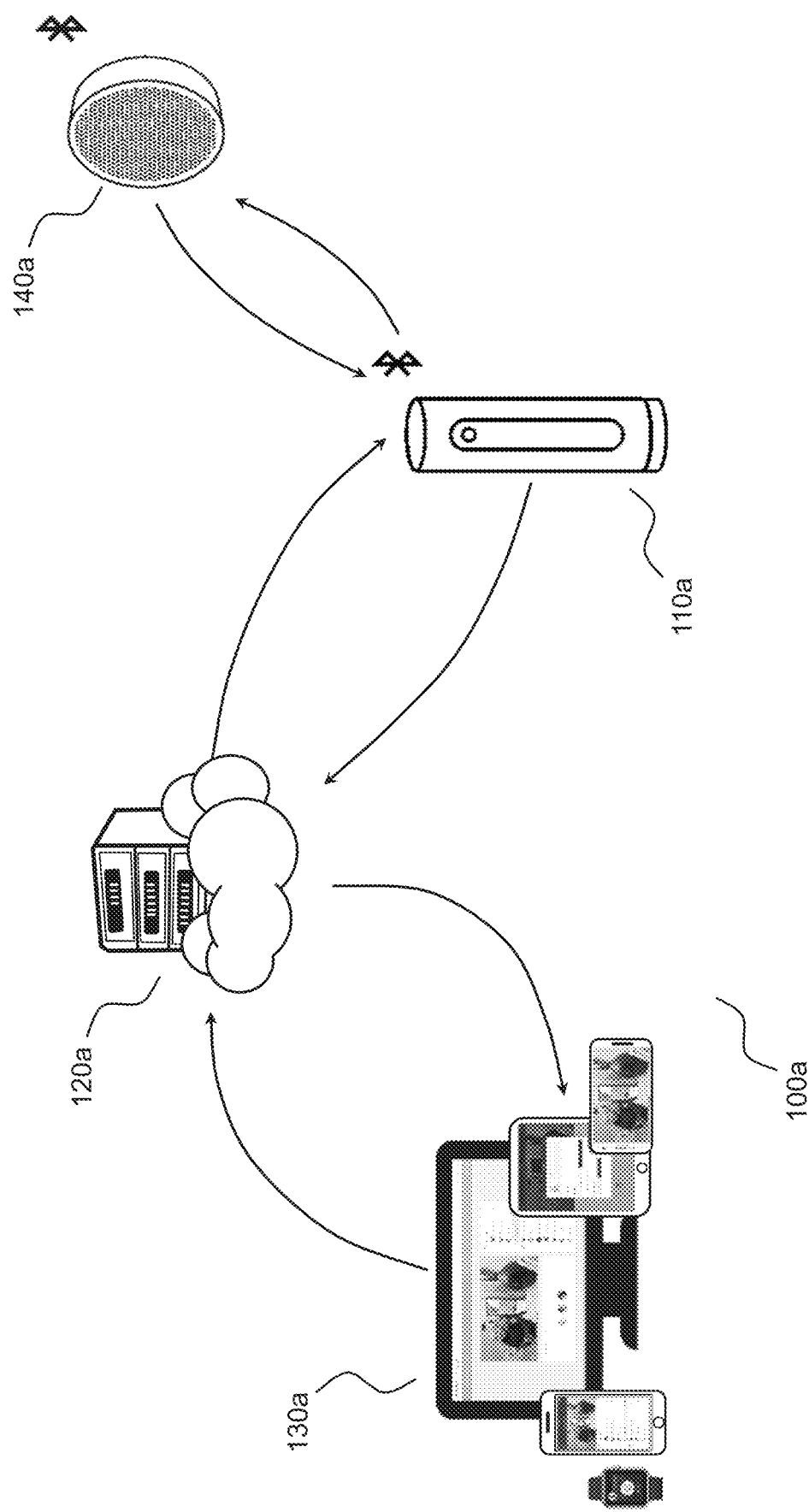

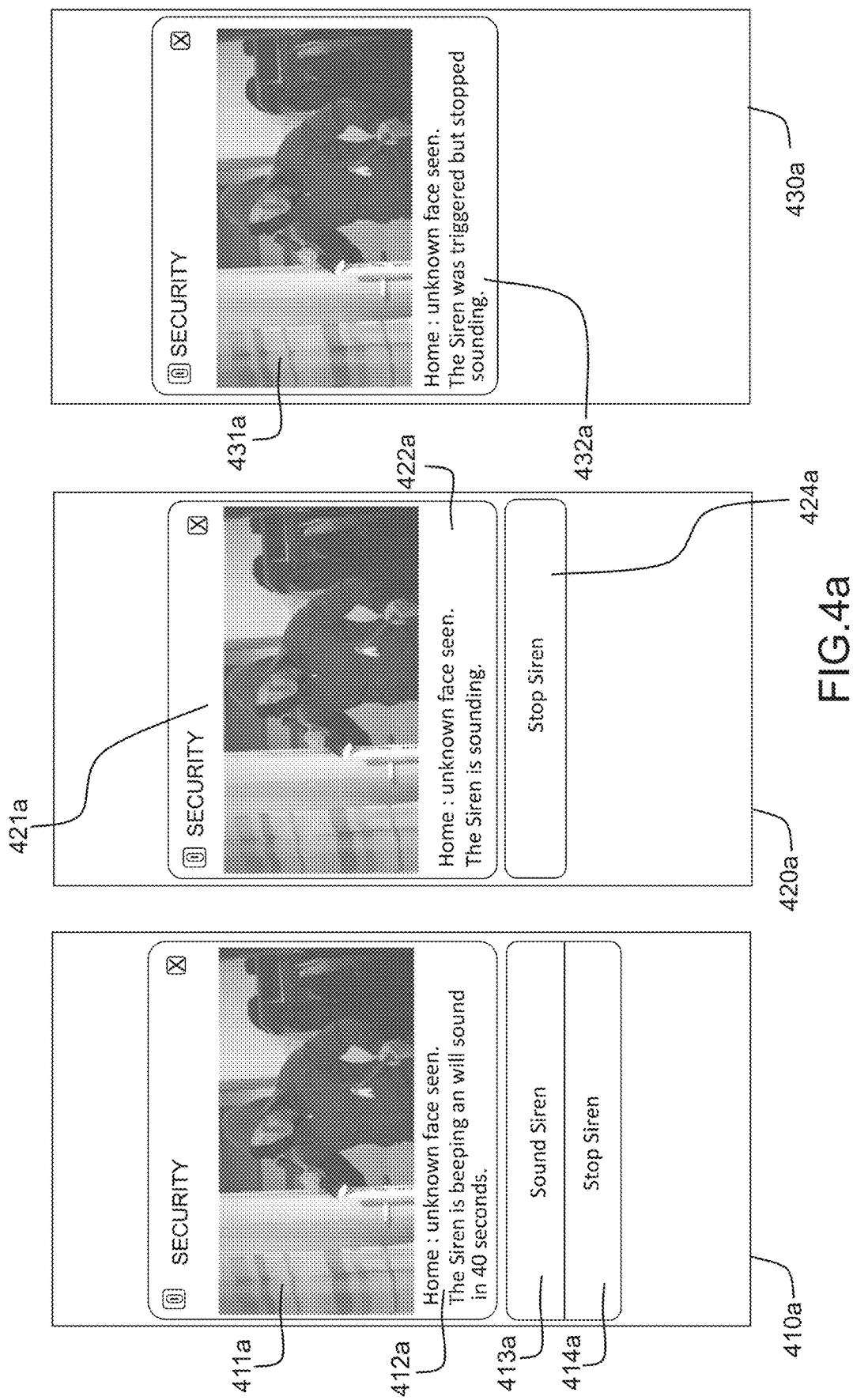

GENERATION OF ALERT EVENTS BASED ON A DETECTION OF OBJECTS FROM CAMERA IMAGES

FIELD OF THE INVENTION

The present invention relates to the field of detection of objects from camera images. It more specifically relates to an improved generation of events based on a detection of objects in camera images.

BACKGROUND PRIOR ART

Video surveillance is the surveillance of a place through video images. Video surveillance provides flexibility and efficiency usually used for managing the security of a place. Indeed, video surveillance can be performed constantly, and capturing images of a place allows a remote and automatic processing of images. Although images can be visually processed, for example by being displayed in real time in a control center wherein security agents monitor in real time images from a video surveillance camera, the increasing amount of sources of video surveillance images increases the need for automatic processing of video surveillance images.

Video surveillance is an efficient solution to prevent burglary. Usual video surveillance solutions for preventing burglary rely on one or more cameras placed in or around a house. The one or more cameras constantly capture images, which are automatically processed in real time. If a human is detected based on an analysis of camera images, an alert is emitted unless said alert is deactivated. The alert may consist in an alarm which is emitted in the house, automatically sending pictures of the detected human to the police, automatically calling police in order that the police are able to perform a rapid intervention, or any other relevant action to be taken to prevent burglary, limit the time left to the burglar to perform it, or allow the police to capture the burglar.

In such systems, the alarm can be manually activated or deactivated by a user of the video surveillance system, for example the owner of the house using a digicode. For example, the user can manually deactivate the alarm when entering or approaching the house, and manually activate the alarm when leaving or going away from the house. Thus, an alarm is emitted only if an unexpected human, for example a burglar, approaches or enters the house.

However, such systems cause an important burden of manual activation or deactivation of alarms to the users of the system. Indeed, a number of false alarms can be triggered if a user forgets to deactivate an alarm before entering a house. Conversely, a burglary can be missed, if a user forgets to activate an alarm when leaving a house.

Another challenge, related to general public video surveillance systems is the unconstrained nature of the field of view. Indeed, contrary to specific video surveillance systems (for example, airport video surveillance systems) wherein the field of view of cameras is controlled, cameras of general public video surveillance systems can be placed in very different environments. Thus, the analysis of images from such cameras is harder to perform, because images of humans can be performed for a number of different angles or fields of view. Meanwhile, images captured by such cameras can include a number of different moving objects (cars in the street, pets...) that render the automatic analysis of images difficult.

There is therefore the need of a device to automatically detect unknown humans and trigger an alert event accordingly, that does not require cumbersome manual activation or deactivation from a user, and is able to operate in environments with a lot of moving objects of different natures.

SUMMARY OF THE INVENTION

To this effect, the invention discloses a device comprising-: a communication link to an image sensor; a communication link to a memory storing face recognition data for a first collection of faces; a processing logic comprising adaptations to: receive an image from the image sensor; classify one or more objects in the image, in a set of classes of objects comprising a human class; detect one or more faces in the image; perform a face recognition of the one or more faces; verify if said one or more faces are included in the first collection of faces; trigger an alert event if a face in the one or more faces, or an object in the one or more objects belonging to the human class does not correspond to any of the one or more faces.

The device of the invention advantageously allows detecting an intruder, even in complex environments comprising moving objects of different natures. Meanwhile, the device of the invention does not trigger an alert when a known person is detected, without needing a manual intervention from a user.

Advantageously, said adaptation to trigger an alert event comprises an adaptation to trigger an alert event if a face in the one or more faces is not included in to the first collection of faces.

This allows triggering an alert, if a human who does not belong to a list of authorized persons is detected.

Advantageously, said adaptation to trigger an alert event comprises an adaptation to trigger an alert event if an object in the one or more objects belonging to the human class does not correspond to any of the one or more faces.

This allows triggering an alert, if a human is detected but cannot be recognized.

Advantageously, the processing logic comprises an adaptation to detect—motion regions in the image, and said adaptation to classify one or more objects comprises an adaptation to classify said one or more objects only in said motion regions; said adaptation to detect one or more faces comprises an adaptation to detect the one or more faces only in said motion regions.

This allows reducing the computing load on the processing logic without reducing its detection capabilities.

Advantageously, said adaptation to receive an image comprises an adaptation to receive a series of successive images of a field of view from the image sensor, said image belonging to said series of successive images; said adaptation to classify one or more objects comprises adaptations to-: calculate pixel differences between the image and an immediately preceding image in the series; and detect motion regions in the image based on said pixel differences.

This allows efficiently detecting motion regions between two successive images.

Advantageously, said adaptation to detect one or more faces in the image comprises an adaptation to define a size of a face detection region based on a size of the motion region and a predefined ratio between a face and a height of a human.

This allows testing face detection with a single window size, and thus greatly reducing the computing load due to face detection. Meanwhile, if the moving region is representative of a human being, the ratio between the sizes of the body and the face of a human being substantially similar for different humans, the predefined ratio allows calculating a window size that provides the most reliable results. Thus, this allows a great reduction of the computing load due to face detection without significant reduction of the efficiency of face detection.

Advantageously, said adaptation to detect one or more faces in the image comprises an adaptation to determine respective positions of the one or more faces; said adaptation to classify one or more objects in the image comprises adaptations to determine respective positions of objects belonging to the human class; said processing logic comprises and adaptation to detect if an object in the one or more objects belonging to the human class does not correspond to a face in the one or more faces in the collection of faces by comparing respective positions of the one or more faces and respective positions of objects belonging to the human class.

This allows verifying if a face has been detected for each object which has been classified as human.

Advantageously, said adaptation to detect one or more faces in the image comprises an adaptation to detect faces only in the motion region wherein an object belonging to the human class has been detected.

The detection of faces only in motion regions greatly reduces the size of pixel areas browsed to detect faces, and thus the computing load of face detection. Meanwhile, the device aims at recognizing moving humans. Thus, performing face detection only in a moving region reduces computing load but does not reduce detection performance.

Advantageously, said processing logic comprises an adaptation to verify if there is at least one motion region wherein no face is detected; said adaptation to classify one or more objects comprises an adaptation to classify one or more objects only in motion regions wherein no face is detected.

This reduces the number of motion regions wherein object classification should be performed, and thus the computing load of object classification.

Advantageously, said adaptation to perform the face recognition comprises an adaptation to perform the face recognition of the one or more faces using a neural network trained for face recognition.

Using a neural network provides an efficient solution for face recognition, which is particularly well suited for a device of the invention, wherein faces may be captured with a large number of different angles of view. Moreover, a neural network can be continuously trained by images labeled by the user, for example images received by the user upon notification of an alert.

Advantageously, the neural network is trained for face recognition and the first collection of faces is built using images of faces labeled by a user of the device.

Training a neural network using labels from a user of the device allows efficiently training the neural network for detecting relatives of the user, and therefore reducing the number of incorrect alerts.

Advantageously, said adaptation to classify one or more objects in the image comprises an adaptation to classify one or more objects in the image using a neural network trained for object classification.

Using a neural network provides an efficient solution for object classification, which is particularly well suited for a device of the invention, wherein moving objects of different natures may be detected.

Advantageously, the set of classes of objects comprises a class representative of a non human animal of a user of the device; said adaptation to classify one or more objects in the image comprises an adaptation to classify one or more objects using a neural network trained to classify objects representative of the non human animal based on a training set of images of the non human animal; the processing logic comprises an adaptation to trigger a specific event if an object in the one or more objects belongs to the class representative of the non human animal.

This allows efficiently detecting a non-human animal, for example a pet of the user. The user may thus be specifically alerted of an activity of his/her animal.

Advantageously, the memory stores face recognition data for a second collection of faces; the processing logic comprises adaptations to: verify if said one or more faces belong to the second collection of faces; trigger an alert event if a face in the one or more faces belongs to the second collection of faces.

This allows specifically receiving alerts if a person whose presence is prohibited is detected. Meanwhile, having specific recognition data allows a more efficient detection of such a person.

Advantageously, the processing logic is adapted not to trigger any alert event, for a predefined duration starting from a recognition of a face in the first collection of faces.

This prevents alerts that may be raised when a known person is accompanied by a relative who is unknown by the device.

The invention also discloses a method comprising receiving an image from an image sensor; classifying one or more objects in the image, in a set of classes of objects comprising a human class; detecting one or more faces in the image; performing a face recognition of the one or more faces; verifying if said one or more faces are included in the first collection of faces; triggering an alert event if a face in the one or more faces, or an object in the one or more objects belonging to the human class does not correspond to any of the one or more faces.

The invention also discloses a computer program comprising computer code instructions configured to: receive an image from an image sensor; classify one or more objects in the image, in a set of classes of objects comprising a human class; detect one or more faces in the image; perform a face recognition of the one or more faces; verify if said one or more faces are included in the first collection of faces; trigger an alert event if a face in the one or more faces, or an object in the one or more objects belonging to the human class does not correspond to any of the one or more faces.

BRIEF DESCRIPTION OF THE DRAWINGS

The invention will be better understood and its various features and advantages will emerge from the following description of a number of exemplary embodiments provided for illustration purposes only and its appended figures in which:

FIGS. 1a, 1b and 1c display respectively two systems and a camera to generate alert events in a number of embodiments of the invention;

FIGS. 4a, 4b and 4c display three examples of displays of a user application in a number of embodiments of the invention;

DETAILED DESCRIPTION OF THE INVENTION

Figure 1B:
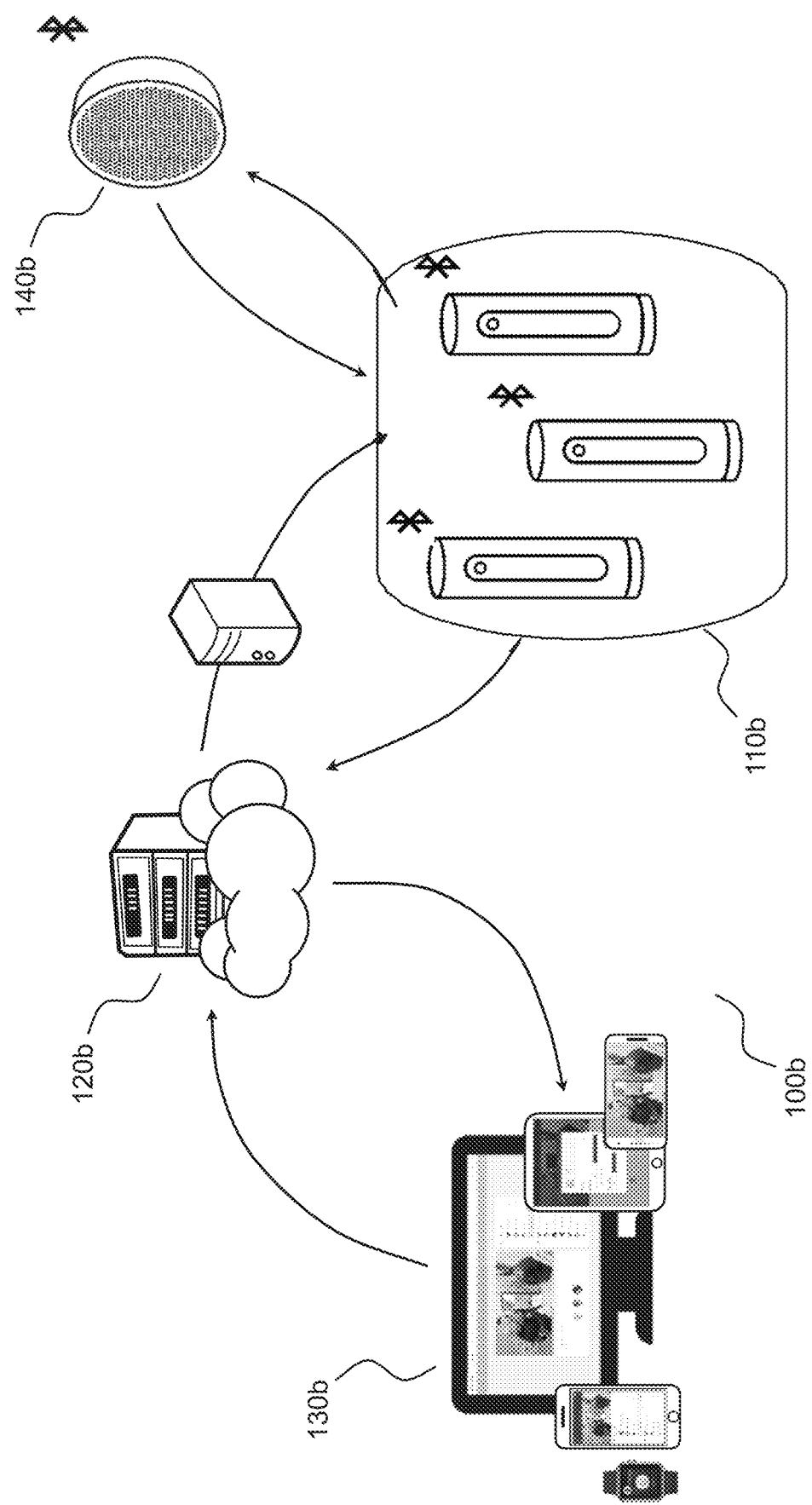
Figure 1C:
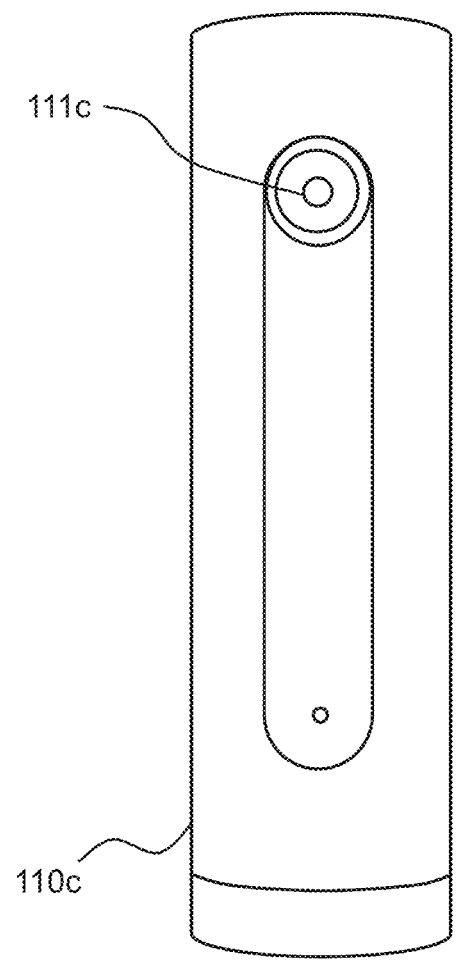

FIGS. 1a, 1b and 1c display respectively two systems and a camera to generate alert events in a number of embodiments of the invention.

FIG. 1a displays a first system to generate alert events in a number of embodiments of the invention.

The system 100a comprises a camera 110a equipped with processing capabilities, one or more servers 120a, one or more user devices 130a, and a siren 140a.

The camera 110a and siren 140a are roughly located in the same place, for example in the same room, or in the same house. The camera 110a can be connected to the siren 140a using any suitable communication link, for example using a wired or radio connection such as Zigbee™, Wi-Fi™, Bluetooth™, NFC, etc . . . The camera 110a, as well as the one or more user devices 130a are connected to the one or more servers, using any suitable connection, for example through Internet, a gateway, a 3G/4G/5G connection, a long distance radio connection, etc . . . .

The one or more user devices 130a can be any user device equipped with connection, display and computing capabilities, for example a computer, a tablet, a connected watch, a smartphone, or the like. The one or more user devices 130a can interact with the camera 110a though the server 120a using an application. For example, the one or more user devices 130a can provide instructions to the camera 110a through the server 120a. Conversely the one or more user devices 130a can receive notifications and images from the camera 110a through the server. For example, the one or more user devices 130a can send instructions to the camera 110a to stop or resume the video surveillance, and receive from the camera 110a streams of video surveillance images, and images of unknown humans.

The camera 110a is configured to detect the appearance of unknown humans in its field of view. For example, it can be placed in front of a door, or in a house, to prevent burglary. For example, the camera 110a can be a Welcome® camera, a series of cameras developed by the applicant of the current application which are polyvalent, easy to use, and can be placed easily in any place in a house. As will be explained with more details hereinafter, the camera 110a is able, when detecting a human in its field of view, to determine if the human is a known human who is authorized to approach the location of the camera 110a, an unknown human or, in a number of embodiments of the invention, a human who is forbidden to approach the location of the camera 110a. In any of the latter cases, the camera 110a is configured to trigger an alert event, in order to prevent an unauthorized human to approach the location of the camera and/or identify such a human.

According to various embodiments of the invention, in case of an alert event, the camera 110a can be configured to perform a number of different actions. For example, it can be configured to activate an alarm emitted by the siren 140a, in order to make the unauthorized human flee. The camera 110a can also send a notification of the event, and an image of the unauthorized human, to the one or more servers 120a. The one or more servers 120a can instantaneously transfer the notification and image to the one or more user devices 130a.

In certain circumstances, a human who is detected by the camera but cannot be identified as having a known face 110a is an unauthorized human, for example a burglar. In this case, a user of the system 100a can perform, using an application on a user device 130a, any step necessitated by—the circumstances, for example automatically calling the police, storing images of the burglar in the camera and/or in the cloud for further identification, etc . . . .

In other circumstances, a human is identified as unknown even if he/she is an authorized human, because he/she has not yet been identified by the camera (for example, a relative of the owner of a house wherein the camera 110a is placed, who visits the house for the first time), or because he/she was not correctly identified (for example if the image of the human identified as unknown has been captured in very unusual circumstances: for example with an unusual angle of view, or if the human wears a new hair style). In this case, a user of the system 100a can input to an application that this human is an authorized one and/or identify the human on the image transmitted by the camera 110a. Thus, the image can be used for further training and improving the face recognition of the camera 110a, in order for this human to be correctly identified the next time he/she enters the field of view of the camera.

The system 100a thus advantageously allows a simple, efficient and flexible detection of unknown humans. The system 100a can be used efficiently in an environment comprising moving objects of different natures. For example, the camera 110a may either capture images of the entrance of building, or images of a street with moving cars in the background. Moreover, the system 100a can be trained and improved throughout its execution. Meanwhile, the execution of human detection by the camera 110a allows the detection of an unauthorized human and activation of the alarm of siren 140a as quickly as possible.

FIG. 1 b displays a second system to generate alert events in a number of embodiments of the invention.

The system 100b comprises a plurality of cameras 110b, one or more servers 120b, one or more user devices 130b, and a siren 140b.

The plurality of cameras 110b, the one or more servers 120b, the one or more user devices 130b and the siren 140b communicate with each other in the same way as the camera 110a, the one or more servers 120a, the one or more user devices 130a and the siren 140a respectively.

The plurality of cameras 110b send video stream to the one or more servers 120b, and the one or more servers 120b process the video stream to detect unknown humans and trigger alert events accordingly. Thus, the one or more servers are configured, based on images received from the one or more cameras 110b, to trigger an alert and perform a number of subsequent operations according to different embodiments of the invention, such as activating an alarm of the siren 140b, sending a notification of the one or more user devices 130b. When the alert activates the siren 140b, the one or more servers are configured to send a notification of the activation of the siren to the plurality of cameras 110b which in turn send an instruction of activation to the siren. The one or more servers 120b can receive user instructions from the one or more user devices 130b, for example to activate/deactivate the alarm, or identify a human. All embodiments discussed with reference to the system 100a and FIG. 1a can be respectively adapted to the system 100b. The execution of human detection by the one or more servers 120b allows easy updates of the detection methods. Meanwhile, the detection using multiple cameras on the same servers allows the creation of a large dataset of faces.

The system 100a and 100b are provided by means of examples only. Other systems of the invention may be used according to the needs of a person skilled in the art.

FIG. 1c displays a camera to generate alerts in a number of embodiments of the invention.

The camera 110c is in this example a Netatmo Wellcome® camera developed by the applicant. The camera 110c can be placed in a large number of different environments. It comprises a full HD (High Definition) image sensor 111c with a wide field of view, to capture image or videos of its environment. It furthermore comprises a processor to detect unknown persons based on the images, and Ethernet and Wi-Fi connections, in order to connect to a local network and send alerts and notifications to a user application. The cameras 110a and 110b of FIGS. 1a and 1b may be for example Netatmo Wellcome® cameras.

FIGS. 2a, 2b, 2c and 2d display four examples of functional architectures of a device in a number of embodiments of the invention.

Figure 2A:
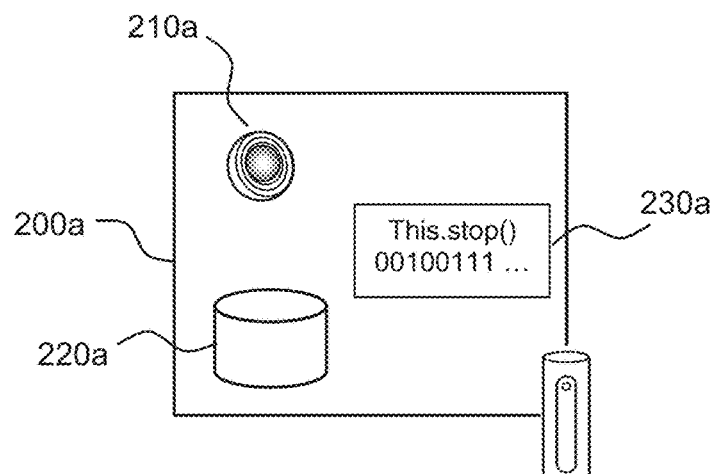
FIGS. 2a, 2b, 2c and 2d display four examples of functional architectures of a device in a number of embodiments of the invention.

FIG. 2a displays a first example of a functional architecture of a device in a number of embodiments of the invention.

The device 200a comprises an image sensor 210a. The device 200a thus comprises an internal communication link, such as a data link, to the image sensor 210a. According to various embodiments of the invention, the image sensor 210a can be a digital image sensor, for example a digital camera. The image sensor 210a can be configured to capture digital images of its field of view. In the present application, the term "image sensor" generally refers to an arrangement that is configured to capture images of a field of view. The image sensor 210a can take a number of different forms. For example, the image sensor 210a can be a CCD (Charge Coupled Device) sensor, a CMOS (Complementary Metal-Oxide-Semiconductor) sensor, an APS (Active Pixel Sensor) or any kind of suitable sensor. The image sensor 210a can also be obtained by combining a plurality of elementary image sensor which captures images that are concatenated afterwards.

According to various embodiments of the invention, the field of view of the image sensor 210a is fixed. In other embodiments of the invention, the field of view of the image sensor 210a is variable. It is the case, for example, if the sensor 210a rotates around an axis or if the device 200a can be displaced by the user. For example, the field of view of the image sensor 210a can be defined so that the image sensor 210a is able to capture images of intruders if they enter a restricted or private area. For example the image sensor 210a can be placed at the entrance of a building, in front of a door, or inside a room.

According to various embodiments of the invention, the image sensor 210a can capture a single image, or series of images. For example, the image sensor can capture images at a predefined frequency, for example at 25 fps (frames per second). According to various embodiments of the invention, the images can be transmitted in a number of different formats and resolutions. For example, they can be transmitted in the form of a still (either raw or compressed) image, or in the form of a video stream. Any suitable format can be used.

The device 200a further comprises one or more memories 220a storing face recognition data for a first collection of faces.

The first collection of faces corresponds to the faces of known persons, whose detection shall not trigger alerts. For example, if the device 200a is configured to detect intruders in a house, the first collection of faces can correspond to the faces of the inhabitants of the house, and their relative or friends.

According to various embodiments of the invention, the one or more memories 220a can be either volatile or non-volatile memories. Any suitable type of memory can be used, such as DRAM (Dynamic Random-Access Memory), SRAM (Static Random-Access Memory), ROM (Read-Only Memory), NVRAM (Non-Volatile Random-Access Memory), flash memory, Solid-state storage, a magnetic tape, an optical disc drive. Any suitable type of memory can be identified by a person skilled in the art.

According to various embodiments of the invention, the face recognition data can take a number of different forms, depending on the type of face recognition techniques which are used. For example, the face recognition data can take the form of vectors, matrices or feature maps at the output of a neural network classifier, corresponding to faces in the first collection of faces.

The device 200a further comprises a processing logic 230a configured to receive images from the image sensor 210a, and trigger alert events based on these images. As will be described in more details hereinafter, the processing logic 230a is notably configured to detect unknown humans, possibly intruders, in the images from the image sensor 210a, and to trigger an alert event accordingly.

The device 230a is thus a self-contained device, which allows raising an alert when an unknown human, or an intruder enters the field of view of the image sensor. Furthermore, the localization of the processing logic 230a and one or more memories 220a on the device 200a allows an instantaneous triggering of an alert by the device 200a when an intruder is detected.

Figure 2B:
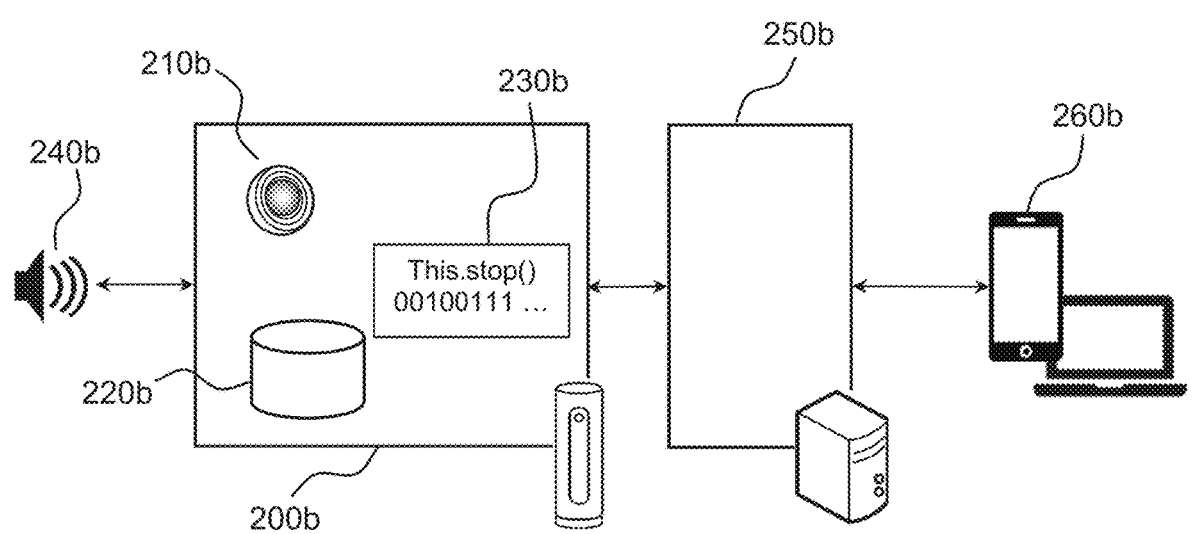

FIG. 2b displays a second example of a functional architecture of a device in a number of embodiments of the invention.

The device 200b comprises an image sensor 210b, one or more memories 220b storing face recognition data for a first collection of faces, and a processing logic 230b configured to receive images from the image sensor 210b, and trigger alert events based on these images, which are respectively similar to the image sensor 210a, the one or more memories 220a, and the processing logic 23a.

The device 200b is connected to a siren 240b. Upon the occurrence of an alert event, the processing logic 230b is configured to activate an alarm of the siren 240b. The device 200b is also connected to one or more servers. The device 200b is further connected to one or more servers 250b, which are in turn connected to one or more user devices 260b. The embodiments of the camera 110a, the siren 140a, the one or more servers 120a, the one or more user devices 130a and the connections in between discussed with reference to FIGS. 1 a are respectively applicable to the device 200b, siren 240b, one or more servers 250b, one or more user devices 260b and the connections in between.

The device 200b thus allows activating a siren alarm upon the detection of an intruder. Meanwhile, the connection to the one or more user devices 260b through the one or more servers 250b allows remote control and monitoring of the operations of the device 200b by the users. Furthermore, the localization of the processing logic 230b and one or more memories 220b on the device 200b allows an instantaneous triggering of an alert by the device 200b when an intruder is detected.

Figure 2C:
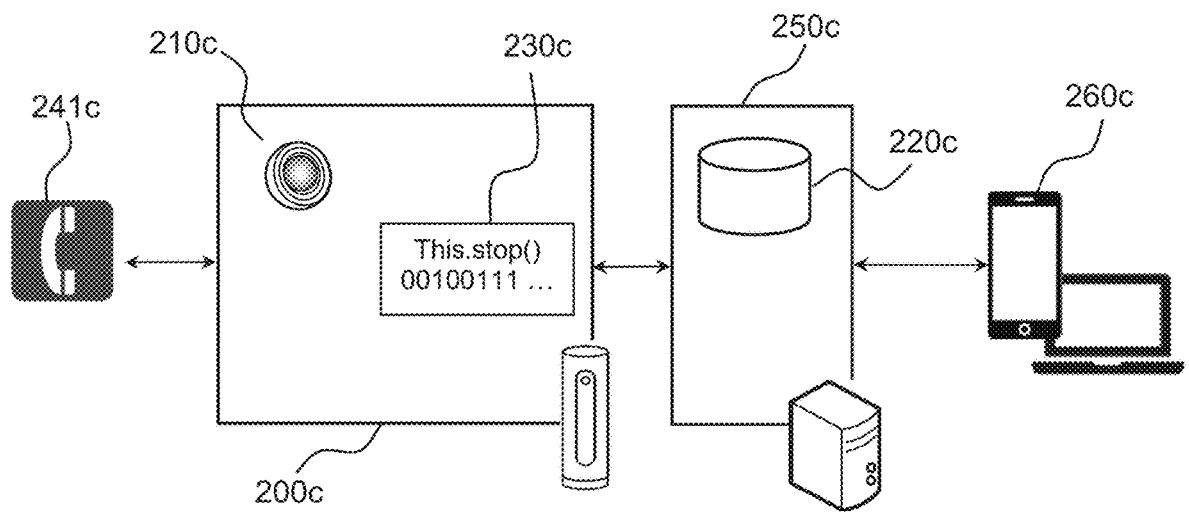

FIG. 2c displays a third example of a functional architecture of a device in a number of embodiments of the invention.

The device 200c comprises an image sensor 210c, and a processing logic 230c configured to receive images from the image sensor 210c, and trigger alert events based on these images, which are respectively similar to the image sensor 210a, and the processing logic 230a.

The device 200b is connected to a phone 241c. The device 200c is also connected to one or more servers. The device 200c is further connected to one or more servers 250c, which are in turn connected to one or more user devices 260c. The embodiments of the camera 110a, the one or more servers 120a, the one or more user devices 130a and the connections in between discussed with reference to FIGS. 1 a are respectively applicable to the device 200b, one or more servers 250b, one or more user devices 260b and the connections in between.

Upon the occurrence of an alert event, the processing logic 230c is configured to automatically perform a call to the police using the phone 241c, and send alert notifications to the one or more user devices 260c.

In order to trigger alert events, the processing logic 230c relies on one or more memories 220c storing face recognition data for a first collection of faces. The one or more memories 220c are located in the one or more servers. The connection between the device 200c and the one or more servers 250c allows the processing logic 230c to query the one or more servers for the relevant face recognition data, and receive said face recognition data. If the server is used to provide services to a plurality of users or groups of users, each user or group of users can have private face recognition data on private memories or private parts of memories. This ensures privacy of data, and that face recognition data can be accessed only by authorized persons.

The device 200c thus allows activating a siren alarm upon the detection of an intruder. Meanwhile, the connection to the one or more user devices 260b through the one or more servers 250c allows a remote control and monitoring of the operations of the device 200c. Furthermore, the localization of the one or more memories on the one or more servers 200c allows sharing face recognition data for the first collection of faces among a plurality of devices that belong to the same users or group of users. This advantageously allows creating larger databases of known faces.

The first collection of faces can be used by a single user or group of users. This use case is for example well suited for a user that owns a plurality of houses and wishes to protect all his/her houses from intrusion and burglary. The first collection of faces can thus be shared with devices for all the houses, and can be enriched by images and identification data performed for a plurality of cameras among the houses.

The first collection of faces can also be used by a plurality of users. This is useful for building large datasets of faces of persons of trust.

Figure 2D:
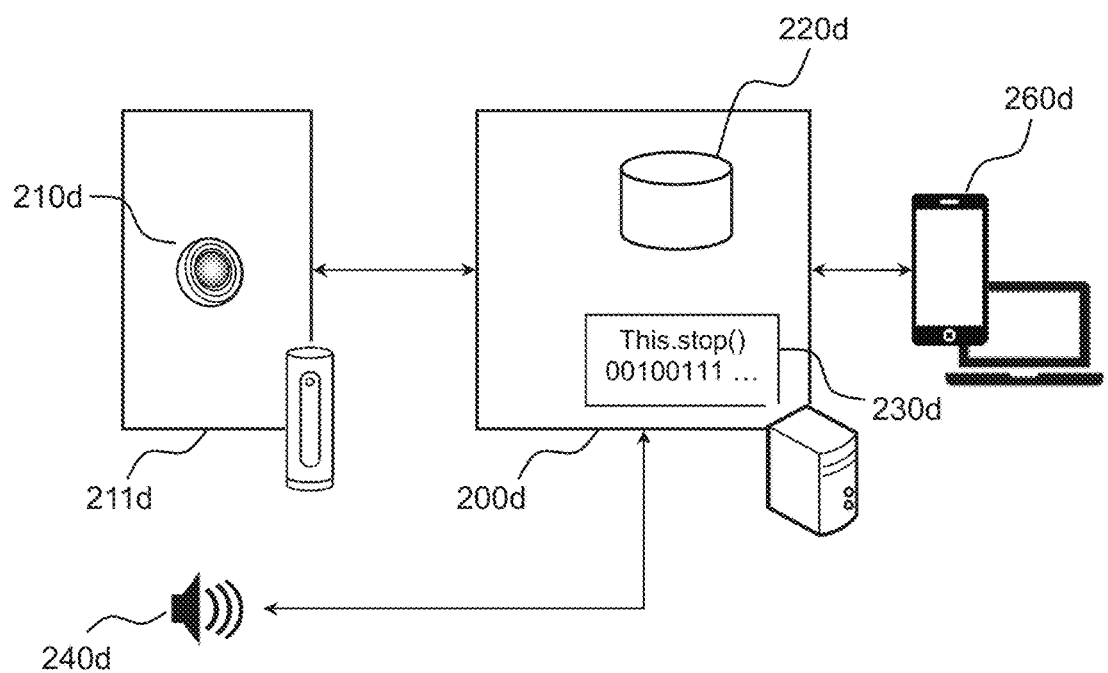

FIG. 2d displays a fourth example of a functional architecture of a device in a number of embodiments of the invention.

The device 200d is a computing device that comprises one or more memories 220d storing face recognition data for a first collection of faces, and is connected to a device 211d comprising an image sensor 210d, which is similar to the image sensor 210a. The device 200d comprises a processing logic 230d configured to receive images from the image sensor 210a, and trigger alert events based on these images. The device 200d is further connected to one or more user devices 260d and a siren 240d. The siren 240d is located nearby the device 211d, for example in the same room.

According to various embodiments of the invention, the device 211d can be for example a camera with communication capabilities. The device 200d can be any kind of computing device with computing, storage and communication capabilities. In a number of embodiments of the invention, the device 200d is a server which is connected to the device 211d, and applications in the user devices 260d. In a number of embodiments of the invention, not displayed in the figures, the device 200d is a server in a cluster of servers, and the one or more memories 220d can be located, in part or in totality, in other servers of the cluster of servers.

The embodiments of the camera 110b, the one or more servers 120b, the one or more user devices 130b, the siren 140b and the connections in between discussed with reference to figures 1b are respectively applicable to the device 211d, the device 200d, the one or more user devices 260d, the siren 240d and the connections in between.

Upon the occurrence of an alert event, the processing logic 230d is configured to automatically activate an alarm of the siren 240d, and send alert notifications to the one or more user devices 260d.

The device 200d thus allows activating a siren alarm upon the detection of an intruder. Meanwhile, the localization of the processing logic 230d, and the one or more memories 220d in the device 200d allows a greater flexibility in the management of detection techniques.

The functional architectures of devices 200a, 200b, 200c and 200d are provided by means of non limitative illustrations of embodiments of the invention. Other functional architectures of devices of the invention could be implemented by a person skilled in the art.

Figure 3A:
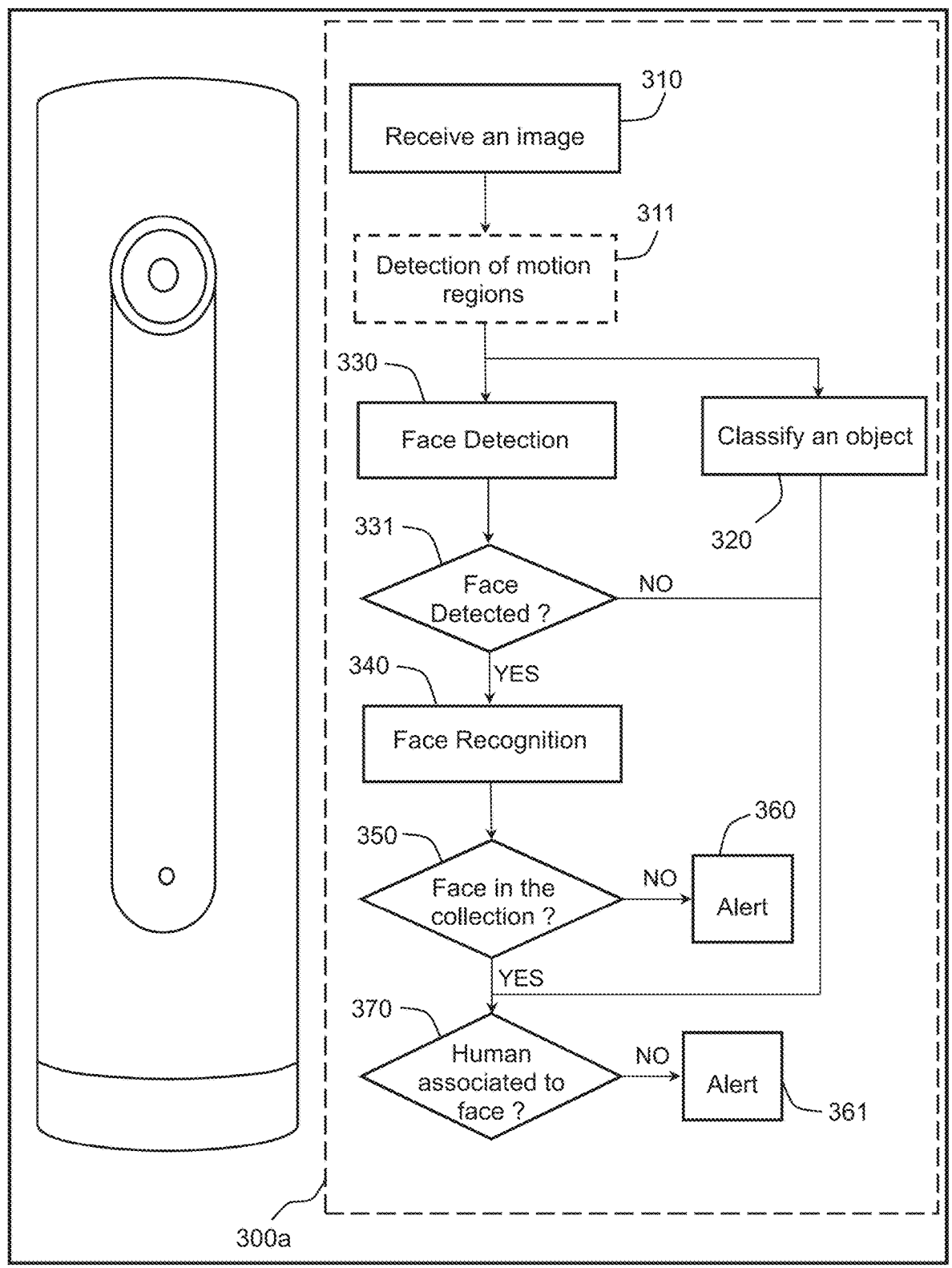
FIGS. 3a, 3b and 3c display three examples of configuration of a processing logic in a number of embodiments of the invention.
Figure 3B:
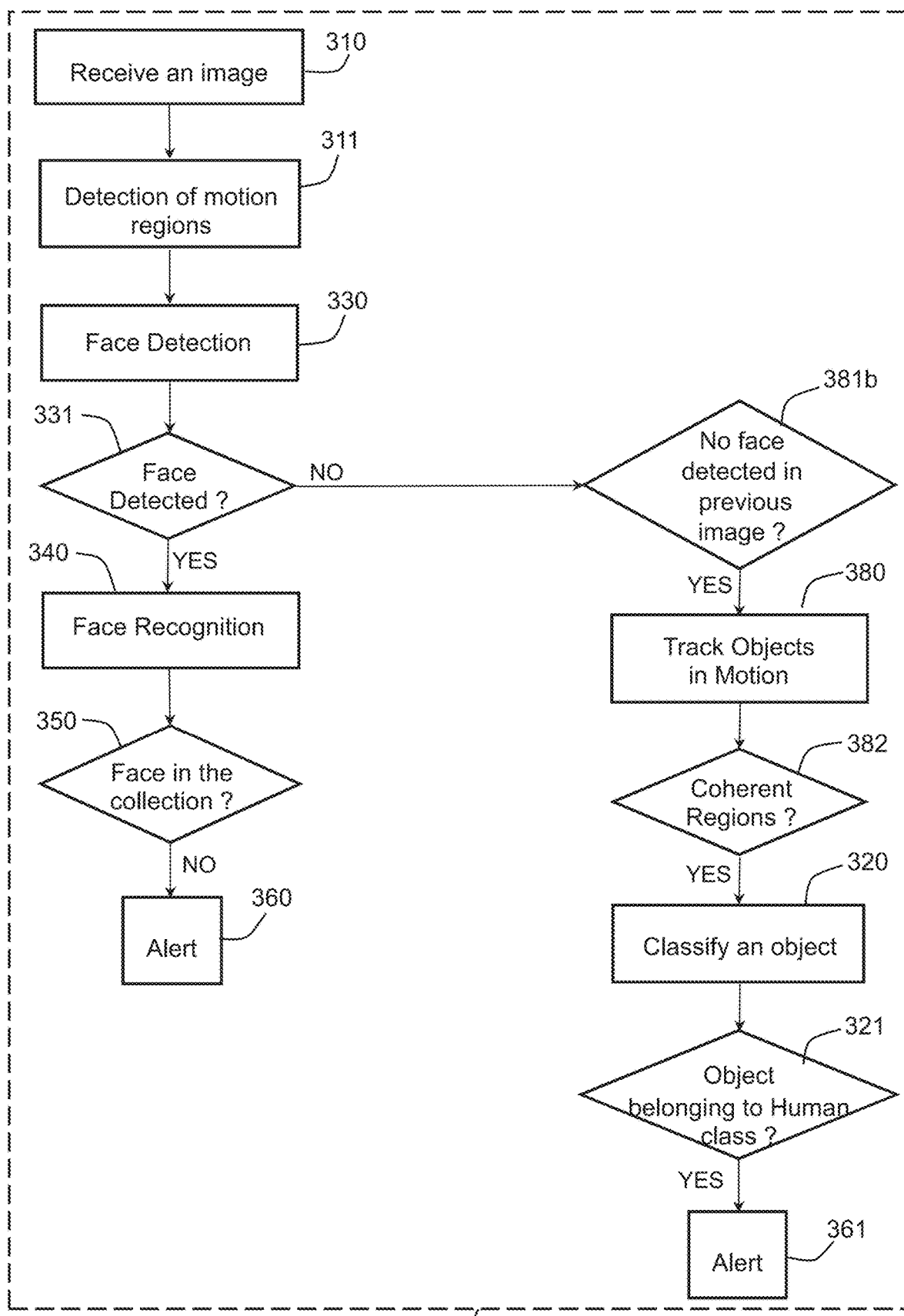
Figure 3C:
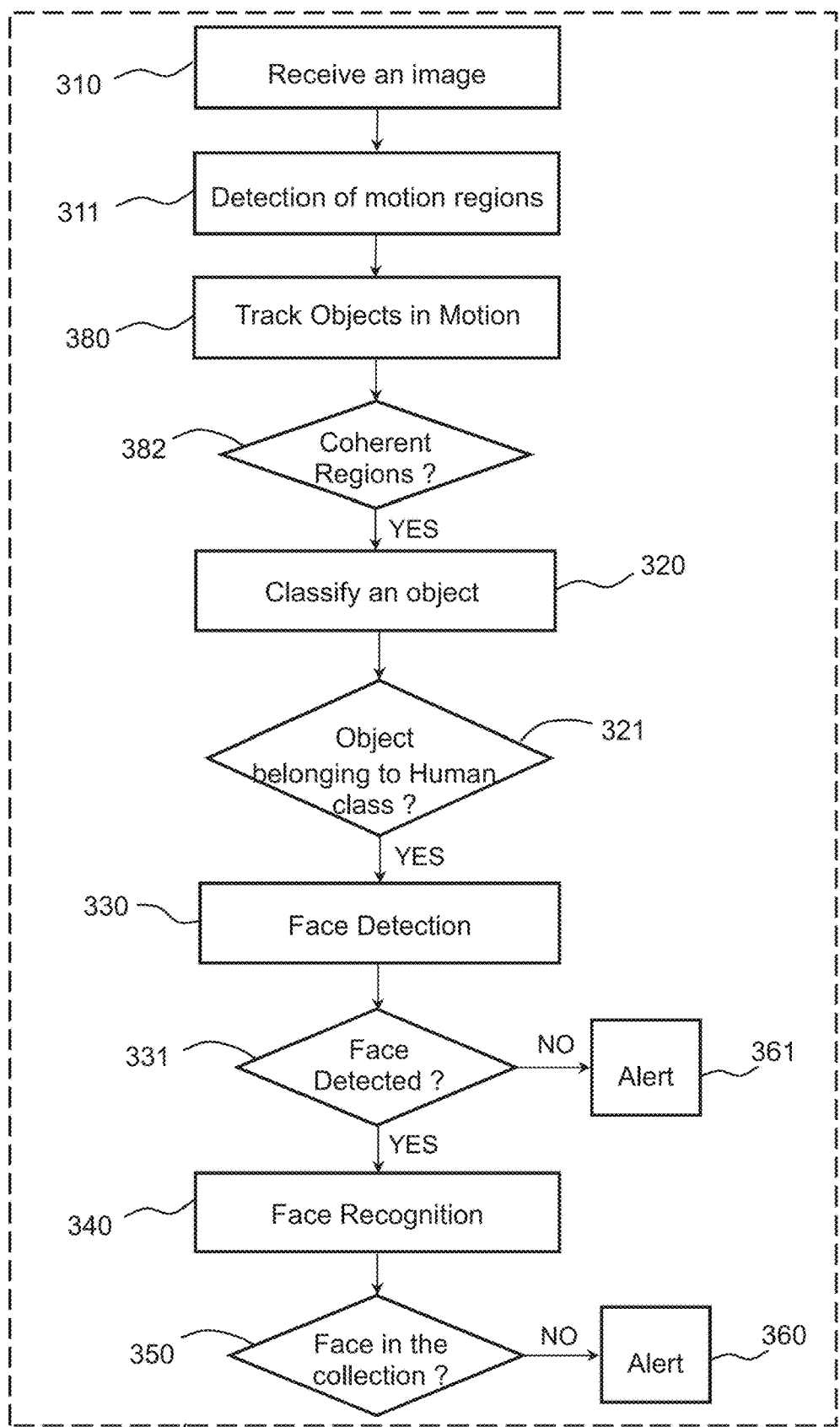

FIGS. 3a, 3b and 3c display three examples of configuration of a processing logic in a number of embodiments of the invention.

According to various embodiments of the invention, a processing logic may be a processor operating in accordance with software instructions, a hardware configuration of the processor, or a combination thereof. It should be understood that any or all of the functions discussed herein may be implemented in a pure hardware implementation and/or by a processor operating in accordance with software instructions, a configuration of a machine learning engine or neural network, or a combination thereof. A processing logic may also be a multi-core processor executing operations in parallel, a series of processors, or a combination thereof. It should also be understood that any or all software instructions may be stored in a non-transitory computer-readable medium. The term "configuration of a processing logic" refers to any means (for example hardware configuration, software instructions, machine learning, training or neural network, or any other configuration means or combination thereof) of configuring a processing logic to execute operations.

In the description below, the term "processing logic" designates any processing logic of a device in any embodiment of the invention, for example the processing logic 230a, 230b, 230c or 230d. The term "one or more memory" designates any memory in any embodiment of the invention, for example the one or more memory 220a, the one or more memory 220b, the one or more memory 220c or the one or more memory 220d; the term "image sensor" applies to any image sensor in any embodiment of the invention, for example the image sensor 210a, the image sensor 210b, the image sensor 210c or the image sensor 210d.

FIG. 3a displays a first example of a configuration 300a of a processing logic in a number of embodiments of the invention.

The FIG. 3a displays the configuration 300a of a processing logic of the camera 110c. However this is displayed by means of purely illustrative purpose, and the configuration 300a could be executed by any device comprising a processing logic of the invention, for example the one or more servers 120b.

The processing logic is first configured 310 to receive an image from the image sensor. All the embodiments described above in relation to the capture of images by the image sensor are applicable to the reception of the image by the processing logic. In a number of embodiments of the invention, the processing logic is configured to receive digital images. As discussed above, the image can be received in any format (for example a raw, lossless compressed or lossy compressed format), and in any resolution. The processing logic may either receive a single image, or series of images. For example, the processing logic may receive successive images from the image sensor, at a predefined frequency, for example at 15 or 25 fps (frames per second). In a number of embodiments of the invention, the image sensor is fixed, and the processing logic is configured to receive successive images of the same field of view. According to various embodiments of the invention, the processing logic may receive the images either on the form of successive independent still images, or in the form of a video stream.

The processing logic is further configured to classify, 320, one or more objects in the image, in a set of classes comprising a human class. The classification of objects in the image mainly aims at detecting mobile objects, such as humans, pets, or vehicles. The set of classes in which objects of the image can be classified is variable according to various embodiments of the invention. It comprises at least a class "human", and can contain classes such as "animal", "other", and/or more detailed classes such as "cat", "dog", "car" or "truck".

According to various embodiments of the invention, any suitable method of object classification can be used to classify objects in the image. For example, object classification can be performed using the method disclosed by: Ren, R. S., He, K., & Faster, R. C. N. N. *Towards real-time object detection with region proposal networks, arXiv preprint. arXiv preprint arXiv:*1506.01497, or Liu, W., Anguelov, D., Erhan, D., Szegedy, C., Reed, S., Fu, C. Y., & Berg, A. C. (2016, October). SSD: Single shot multibox detector. In *European Conference on Computer Vision* (pp. 21-37). Springer International Publishing.

In a number of embodiments of the invention, humans are detected in the image using trained neural networks. For example objects can be classified in the image using a neural network using the technique disclosed in Szegedy, C., Liu, W., Jia, Y., Sermanet, P., Reed, S., Anguelov, D., . . . & Rabinovich, A. (2015). Going deeper with convolutions. In *Proceedings of the IEEE Conference on Computer Vision and Pattern Recognition* (pp. 1-9).

Human detection techniques which are not based on neural networks may also be used by the invention. For example, methods based on a descriptor and a classifier can be used, as disclosed for example by: . . . Dalal, N., & Triggs, B. (2005, June). Histograms of oriented gradients for human detection. In *Computer Vision and Pattern Recognition, 2005. CVPR 2005. IEEE Computer Society Conference on* (Vol. 1, pp. 886-893). IEEE.

A neural network can have associated therewith reference vectors representative of each class that can be stored in the one or more memories for example. The neural network classifies objects in the image by generating vectors representative of objects from the image, and comparing these vectors to reference vectors. In a number of embodiments of the invention, a user can improve the training of the neural network by adding classification and labels to images captured by the image sensor.

In a number of embodiments of the invention, each classified object has associated therewith a position in the image. The position of the object in the image can be expressed in any relevant form, for example a horizontal and vertical position, in pixels, in the image, or a description of a region which is occupied in the image by the object.

In parallel of object classification 320, the processing logic is further configured to detect 330 one or more faces in the image. Face detection 330 can be performed using any known technique, for example the techniques disclosed by: Viola, P., & Jones, M. (2001). Rapid object detection using a boosted cascade of simple features. In *Computer Vision and Pattern Recognition, 2001. CVPR 2001. Proceedings of the 2001 IEEE Computer Society Conference on* (Vol. 1, pp. I-I). IEEE, Liao, S., Jain, A. K., & Li, S. Z. (2016). A fast and accurate unconstrained face detector. *IEEE transactions on pattern analysis and machine intelligence*, 38(2), 211-223, or Chen, D., Ren, S., Wei, Y., Cao, X., & Sun, J. (2014, September). Joint cascade face detection and alignment. In *European Conference on Computer Vision* (pp. 109-122). Springer International Publishing.

Each detected face can be associated with a position. The position of the face in the image can be expressed in any relevant form, for example a horizontal and vertical position, in pixels, in the image, or a description of a region which is occupied in the image by the object.

At the output of face detection 330, the processing logic is configured to verify 331 if one or more faces have been detected. If one or more faces have been detected, the processing logic is further configured to perform face recognition 340 of the one or more faces.

According to various embodiments of the invention, any suitable method of face recognition can be used to classify objects in the image. The face recognition 340 may notably determine characteristics of a face (symmetry of the face, color of the skin, eye width . . . ), and use statistical techniques to compare characteristics of the face to reference characteristics of face recognition data. If the characteristics of a face match or are close to reference characteristics of a reference face in face recognition data, the face recognition can output that the face corresponds to the reference face. Otherwise, face recognition 340 can output that the face is unknown.

In a number of embodiments of the invention, faces can be recognized using trained neural networks. For example, face recognition 340 generates a vector from the face, and face recognition data is a set of vectors corresponding to the first collection of faces. It can thus be assumed that the vector is representative of a face in the first collection of faces, if the distance between the vector and at least one vector in the set of vectors corresponding to the first collection of faces is below a threshold. Face recognition 340 can be performed for example using the technique disclosed in Sun Y., Liang, D., Wang, X., & Tang, X. (2015). Deepid3: Face recognition with very deep neural networks. arXiv preprint arXiv:1502.00873.

In a number of embodiments of the invention, face recognition 340 is performed by generating a model of a face from a number of reference images of the face, then providing an image to the model, which determines if the image of the face represents or not the same person than the person represented by the reference image. Such models can provide a binary result (is this the same person or not). Other kinds of models classify an image of a face into a plurality of classes corresponding to a plurality of faces.

In a number of embodiments of the invention, a neural network is trained for face recognition and face recognition data for the first collection of faces is built using images of faces labeled by a user of the device. This allows the user of the device to specifically train the neural network to recognize faces of his/her relatives, or more generally the persons which are authorized to enter the field of view of the image sensor.

The output of face recognition 340 can take a number of different forms. For example, face recognition 340 can output an ID of a recognized face, or a null ID, if it has been unable to recognize any face.

At the output of face recognition 340, the processing logic is further configured to verify 350 if the one or more faces belong to the first collection of faces. This can be performed for example by verifying the identifier (id) returned by the face recognition 340 belongs to a set of ids corresponding to the first collection of faces.

If a face does not belong to the first collection of faces, the processing logic is configured to trigger 360 an alert event. Indeed, this means that a human whom is not recognized, and thus possibly an intruder, entered the field of view of the image sensor.

If a face belongs to the first collection of faces the processing logic is further configured to use the outputs of face detection 330, face recognition 340, and object classification 320 to verify 370 whether all humans classified by the classification of objects 320 correspond to any of the one or more faces. This can be achieved for example by verifying that each position of a human corresponds to the position of a face. Thus, human beings and faces can be detected in parallel, and associated based on their position in the image. As will be described in more details hereinafter, other options are available for verifying if each human corresponds to a face. For example, the processing logic can be configured to first detect human beings, then perform face detection on each human detected in the image.

If at least one classified object does not correspond to a face, the processing logic is configured to trigger 361 an alert event. Indeed, that means that a human has been detected, but is not recognized.

The double condition for triggering an alert, if a human is detected but no face is detected for this human, or if a face is not recognized as belonging to the first set of faces, allows triggering an alert in any suspicious case, wherein an intruder possibly entered the field of view of the image sensor. Meanwhile, this allows a reduction of false positives and useless alerts. For example, an alert will not be triggered for any kind of movement. Moreover, the use of the first set of classes corresponding to known persons, who are authorized to enter the field of view of the image sensor, removes the need for manually activating and deactivating the alerts using a pin code.

It shall be noted that, although face detection 330 and object classification 320 are represented in FIG. 3a as being executed in parallel, in other embodiments of the invention, they can be executed sequentially.

As discussed above, an alert event can take a number of different forms. More specifically, an alert event may be defined as one or more of activating a siren, performing an automatic call to the police, or sending a notification and picture to a user of the device.

Upon reception of an alert, the user may confirm or refute the alert. If the alert is caused by detecting a person which is known by the user, but which was not recognized, either because no image of the person was even captured by the image sensor, or because previous images of the person were taken in different conditions, the user may refute the alert, and tag the known person in the image, in order to enrich the face recognition data.

In certain circumstances, a user may wish not only to be alerted of the presence of a person who is unknown or not recognized, but also, in some embodiments, to specifically designate persons whose presence is forbidden in an area, for example persons who are subject to a removal order from the area.

In order to achieve this result, the one or more memories can further store face recognition data for a second collection of faces, for example faces of persons whose presence is forbidden. The processing logic can be configured to verify, at the output of face recognition, if a face belongs to the second collection of faces, that is to say if a face has been recognized as being the face of an unauthorized person, and trigger an alert event if it is this case.

This allows tailoring the alert event to the person which has been recognized. For example, if the unauthorized person is a known burglar, the police can be alerted without delay. Similarly, a user of the device can receive a tailored alert notification without delay.

In certain circumstances, users of the device may be accompanied by persons which have not been identified yet. This is for example the case if a user of the device invites a new friend, or colleague, to dine at his/her house. When the new friend, or colleague, enters the field of view of the image sensor, his/her face is not present in the first set of faces, and the processing logic may trigger an alert event. This behavior may not be desired, since it results in a number of unwanted alerts, and sirens.

In order to solve this issue, in a number of embodiments of the invention, the processing logic is configured not to trigger any alert event, for a predefined duration starting from a recognition of a face in the first collection of faces. Thus, as soon as a known person is identified, the alert events are deactivated for a predefined duration (for example from several seconds to some minutes). This allows avoiding useless alerts when an unknown person accompanies a known one. In a number of embodiments of the invention, the alerts are delayed for a short period of time, and deactivated as soon as a known person is detected. This allows avoiding an unnecessary alert, if an unknown person accompanies a known one and is detected first.

In a number of embodiments of the invention, the processing logic is configured to perform the face detection 330, and object classification 320 on the whole image. This allows an exhaustive detection of any face or object of interest present on the image. These embodiments are especially convenient for small images, or in case of very powerful computing capabilities.

However, in a number of embodiments of the invention, face detection 330, face recognition 340 and object classification 320 will be executed in real time with limited computing capabilities. For example, if the image sensor outputs images at 25 fps (frame per second), the processing logic shall perform the whole operations of configuration 300a 25 times every second in order for intruders to be detected in real time. The algorithms of face detection 330, face recognition 340 and object classification 320 are known to be very computationally intensive. It may thus be difficult for standard computing capabilities to execute the configuration 300a in real time, especially if the image sensor captures images at a high frequency or a high resolution.

In a number of embodiments of the invention, the processing logic is configured to detect 311 motion regions in the image between image reception 310 and face detection 330/object classification 340, and to perform face detection 330 and object classification 320 on motion regions only. This allows executing face detection 330 and object classification 320 only on motion regions of the image. These steps are thus executed only in a part of the image, and the computing complexity of the configuration 300a is greatly reduced, which allows executing it in real time on a wider range of computing capabilities. Meanwhile, since the objects of interest to detect intrusions, as well as faces to detect, are by nature mobile, executing face detection 330 and object classification 320 on a motion region only does not diminish the ability of a device of the invention to detect intruders.

According to various embodiments of the invention, a number of techniques are available for detecting motion regions. In a number of embodiments of the invention, the processing logic receives successive images of the same field of view, and is configured to detect motion regions by comparing at least two successive images.

For example, the processing logic may be configured to compare two successive images pixel by pixel, perform a filtering in order to remove sensor noise, and detect a motion in regions where there were important pixel differences that are apparent. The processing logic may further be configured to detect if the motion of an object within a motion region is coherent, that is to say if all subparts of the object move in the same direction, and perform subsequent operations only in regions wherein motion is coherent. This allows further reducing the computing load of the execution of configuration 300a. Indeed, motion regions comprising coherent motion are far more likely to represent a moving object or a human being, contrary to motion regions without coherent motion, which may represent for example less coherent motion such as motion of leaves in trees.

Other techniques may be used to detect motion regions, such as for example the techniques disclosed by: T. Aach and A. Kaup. Bayesian algorithms for adaptive change detection in image sequences using markov random fields. *Signal Processing: Image Communication,* 7:147-160, 1995, Li, R., Yu, C., & Zhang, X. (2006, October). Fast robust eigen-background updating for foreground detection. In Image Processing, 2006 *IEEE International Conference* on (pp. 1833-1836). IEEE, or A. Mittal and N. Paragios. Motion-based background subtraction using adaptive kernel density estimation. Proceedings of the international conference on *Computer Vision and Pattern Recognition,* 2004.

In a number of embodiments of the invention, the processing logic is configured to perform face detection 330 using algorithms using a sliding window analysis. Such algorithms rely on analyzing the content of windows of pixels to determine if a face is present in the window of pixels. In order to fully test if a face is present in a region, such algorithms define windows of different sizes, and, for each window size, move the window pixel by pixel through all the region. Thus, faces can be detected for each possible face size, and face position. Although providing a very accurate result, such methods are very computationally intensive, and may be difficult to execute in real time using standard computing capabilities, even if they are used only on motion regions.

In a number of embodiments of the invention, the processing logic is configured to calculate, for each motion region, a face size based on the size of the motion region and a predefined face size ratio, and to define a face detection region based on the face size. For example, the face size may be defined as a fifth of the height of the motion region, in pixels, and the face detection regions can be defined as a square region whose size is the face size. The processing logic may also be configured to adapt the shape of the face detection region depending on the shape of a motion region.

This allows defining a face detection region which has a priori a good shape and size depending on the size of the motion region. Indeed, a face may be detected only if the motion region represents a human being. In this case, the face of the human being shall have a size roughly proportional to the height of the human being. Thus, this allows detecting faces only using face detection regions which have dimensions that have a high chance of containing a face, if the motion region represents a human being.

The processing logic may further be configured to define the position of the face detection region depending on the motion region. For example, assuming a human being is usually moving with his/her head on top of his/her body, the face detection region shall be placed first on top of the motion region, then moved pixel by pixel to cover all places on top of the motion region wherein a face has a reasonable chance of being detected.

In order for the user to avoid receiving useless notifications and alerts, the device of the invention focuses on detecting intruders. For example, movements generated by pets and animals are not expected to generate alerts.

However, a user may wish to keep an eye on a pet, or simply receive notifications of his/her pet's activities. In a number of embodiments of the invention, the processing logic is configured to classify 320 one or more objects in the image in a set of classes comprising a class representative of a pet of the user. The classification can be performed using a neural network trained to classify objects representative of the pet based on a training set of images of the pet. The training may be performed during a preliminary training phase wherein the user submits images of his/her pet, during execution of the configuration 300a, if the user receives notifications of movement, and labels his/her pet in images provided by the image sensor, or a combination thereof.

Upon detection of an object representative of the pet of the user, the processing logic is configured to trigger a specific event, which is representative of the pet being detected. Upon the occurrence of such event, a specific notification can be sent to the user, with for example the image of the pet. The user can thus monitor his/her pet's activity, in addition to other notifications and alerts.

It shall be noted that the order in which the steps executed by the configuration 300a of the processing logic are not limitative. They are provided by means of example only of configurations of a processing logic of the invention.

FIG. 3b displays a second example of a configuration 300b of a processing logic in a number of embodiments of the invention.

In the configuration 300b, the processing logic is configured to receive 310 an input image; perform a face detection, 330; verify 331 if a face is detected; if a face is detected, perform a face recognition 340; verify 350 if the face belongs to a first set of faces; if it does not belong to the first set of faces, trigger 360 an alarm.

The configuration 300b is executed for a number of successive images of the same field of view. If, at the output of verification 331, no face is detected, the processing logic is configured to verify 381b if no face were detected for this motion region in the current or in a previous image. If it is the case, the processing logic is configured 380 to track one or more motion objects among motion regions of successive images.

The tracking 380 of one or more moving objects among motion regions of successive images can be performed using any relevant technique, for example by eliminating global changes in between the image and the previous image in the series (for example global changes of luminosity), and detecting if a previously detected object is identified in a motion region of a current image. Tracking motion objects among successive images allows avoiding successive classification of the same objects in each image. This reduces the computing load of the configuration 300a, since object classification is usually a very complex technique.

The processing logic is further configured to detect 382 one or more coherent regions, that is to say one or more regions that are representative of the same objects among successive images.

In a number of embodiments of the invention, the processing logic is configured 320 to classify objects in a set of classes comprising at least a human class for each coherent region which has been detected. The processing logic is further configured to verify 321 if at least one object belongs to the human class. Alternatively, the processing logic is configured 320 to classify objects only in region wherein a previously detected object has not been tracked, in order to lower the number of classifications to perform. If at least one object belongs to the human class, the processing logic is configured 361 to trigger an alarm.

The configuration 300b advantageously performs object classification 320, only for motion regions wherein no face is detected. This allows a reduction of computing load of the configuration, since the object classification 320, which is complex, is performed only for motion regions wherein no face has been detected.

Meanwhile, the conditions of triggering of an alert event are globally similar to the conditions of triggering of an alert event of the configuration 300a: an alert event is triggered 360 if a face is detected but does not belong to the first set of faces, or an alert event is triggered 361 if a human being is detected, without having a face detected herewith.

FIG. 3c displays a third example of a configuration 300c of a processing logic in a number of embodiments of the invention.

In the configuration 300c, the processing logic is configured to receive an input image 310, and detect motion regions 311.

Contrary to configurations 300a and 300b, in configuration 300c the processing logic is not configured to always perform face detection 330. On the contrary, the processing logic is configured, upon detection 311 of motion regions, to track 380 motion objects among motion regions of successive images, detect 382 coherent regions, classify 320 motion objects in a set of classes comprising a human class, and verify 321 if at least one object belongs to the human class.

If an object belongs to the human class, the processing logic is configured 330 to perform face detection in the corresponding motion regions. In a number of embodiments of the invention, an object which is classified in the human class is associated to a number of characteristics, such as for example a position in the motion region, a position in the image, a height in pixel, a color of the skin etc... These characteristics can be provided as input to face detection 330 in order to provide additional information which may be useful for face detection, and thus increase the efficiency and/or reduce the complexity of face detection.

The processing logic is further configured 331 to verify if a face is detected in each motion region. If no face is detected in a motion region, the processing logic is configured to trigger an alert event 361. For each detected face, the processing logic is configured to perform face recognition 340, and verify 350 if the face is in the first collection of faces. If at least one face does not belong to the first collection of faces, the processing logic is configured to trigger an alert event. Similarly to the configurations 300a and 300b, in the configuration 300c the processing logic is configured to trigger 361 an alert event if an object is classified as corresponding to a human being, for which no face is detected, and the processing logic is configured to trigger 360 an alert event if at least one face is detected but not recognized as belonging to the first collection of faces.

Meanwhile, in the configuration 300c, face detection 300 and face recognition 340 are performed only for regions comprising an object classified as human. This allows reducing the number of face detections, and thus reducing the computing complexity of the alert generation.

Figure 4B:
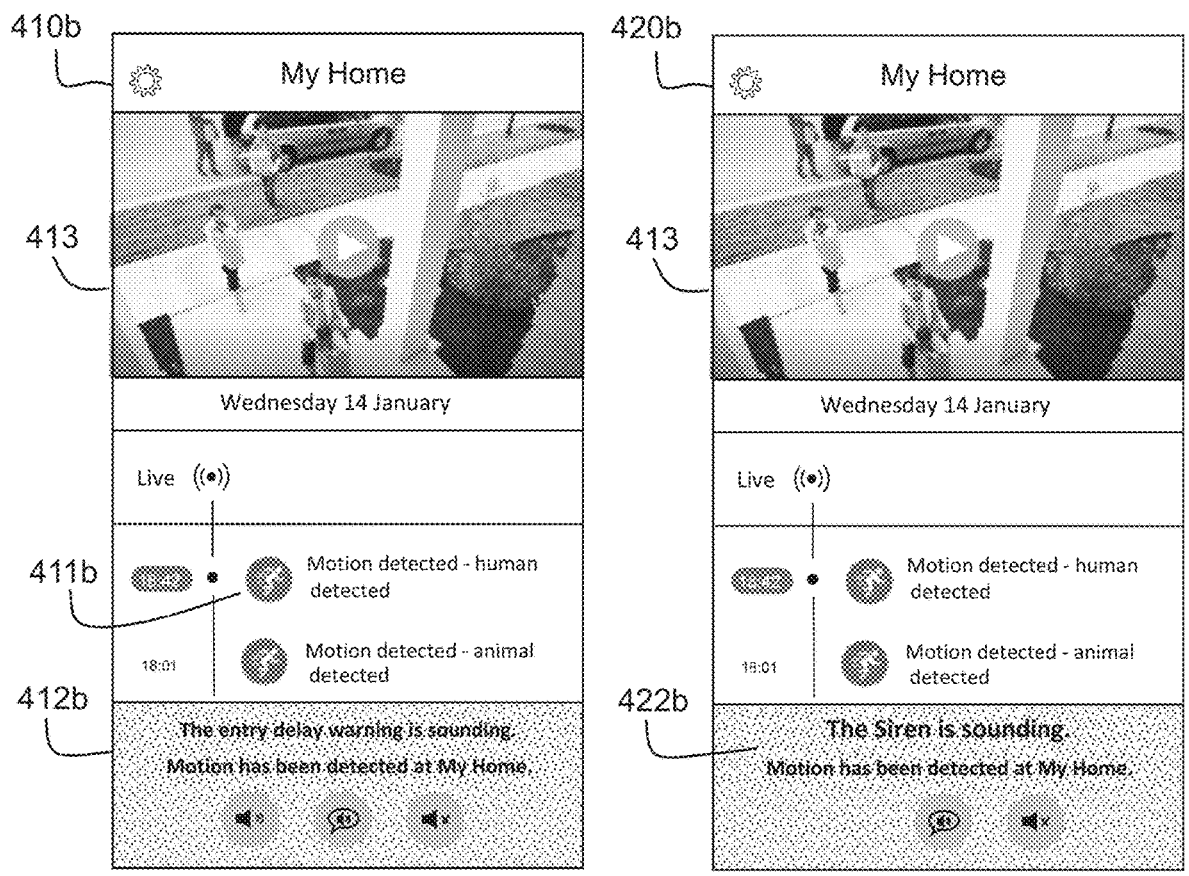
Figure 4B:
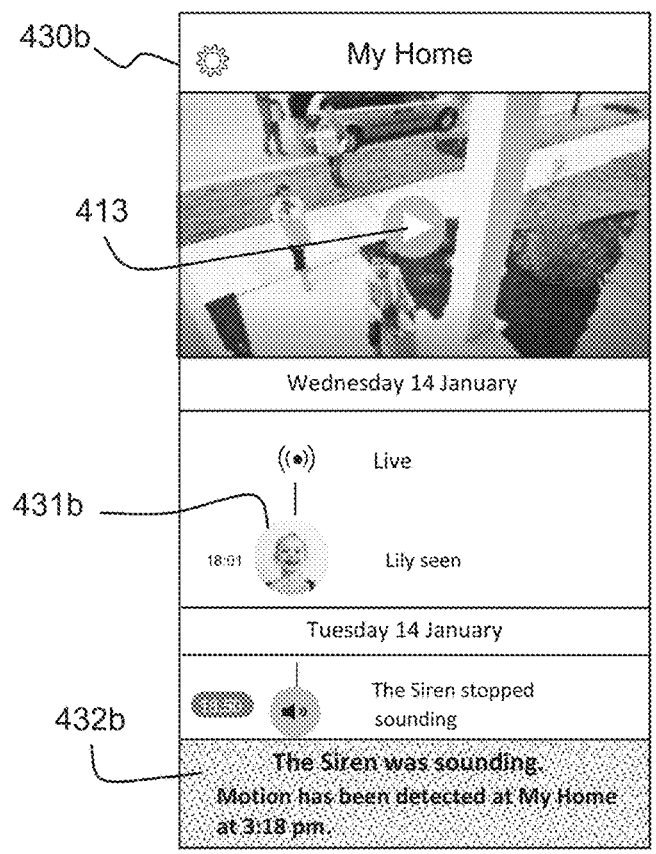
Figure 4C:
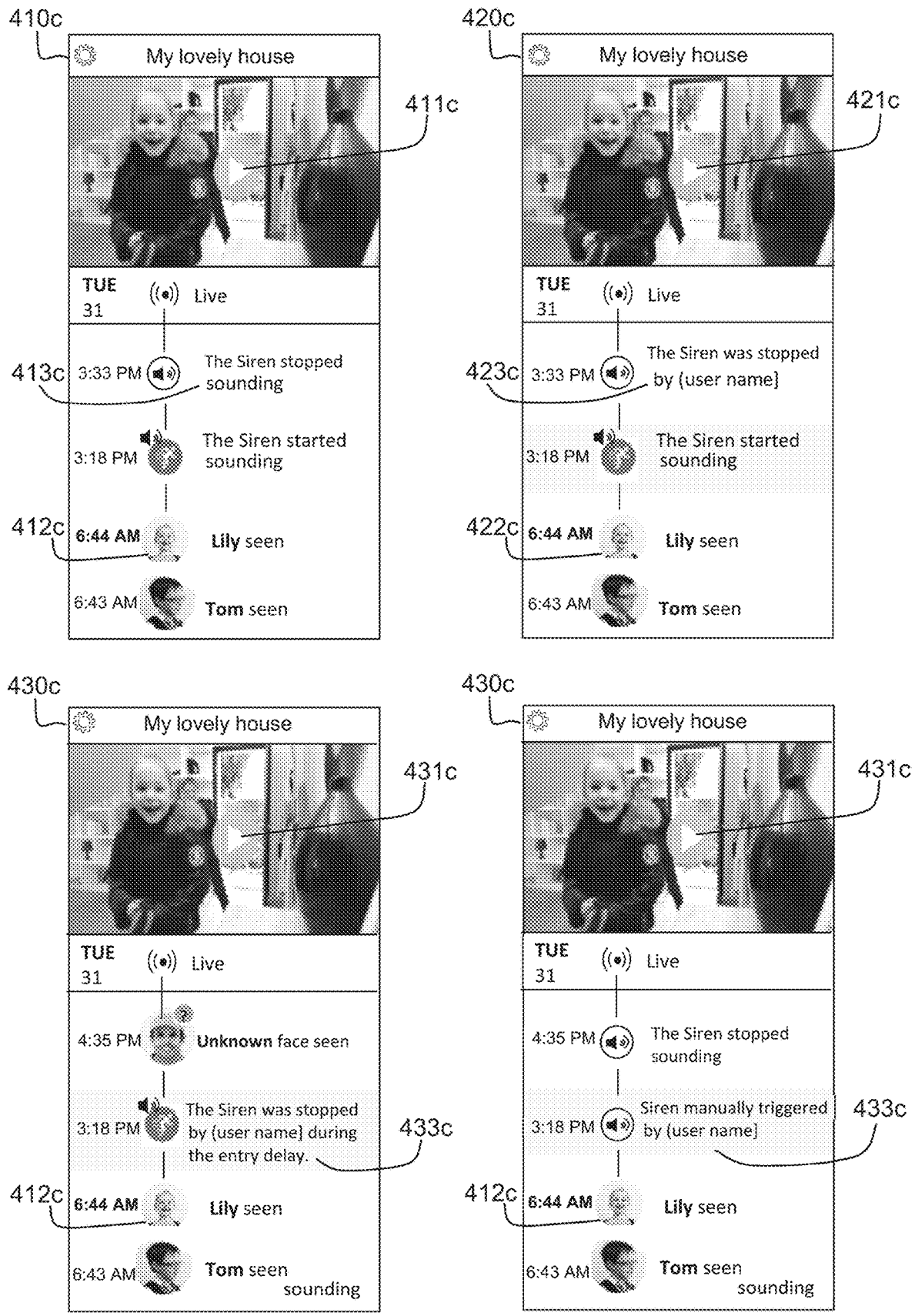

FIGS. 4a, 4b and 4c display three examples of displays of a user application in a number of embodiments of the invention.

FIG. 4a displays a first example of a display of a user application in an embodiment of the invention.

In this example, a burglar enters the house of a user. The burglar enters the field of view of a device of the invention. The processing logic of the device of the invention detects an unknown face, triggers an alert event, and sends a notification to a user device, for example one of the user devices 130a, 130b, and the image in which it has detected the burglar.

The user device is equipped with a security application. Upon reception of the notification, the application displays the screen 410a. The screen 410a contains a frame 411a displaying the image of the burglar captured by the image sensor, an indication that the siren of the house is beeping and will start sounding in 40 seconds in absence of feedback from the user.

When the user sees the image, he/she may decide to press the button 413a to sound the siren immediately (which should be the case here, as the image clearly represents a burglar), or the button 414a to stop the siren in case of false positive if the person is known by the user. In this example, the 40 seconds delay advantageously prevents a useless sound of the siren in case of false positive if the user presses the button 413a during the delay.

When the user presses the button 413a, the siren starts sounding immediately. The application switches to the screen 420a. The frame 421a is updated with newer images from the image sensor, as soon as they are captured and transmitted. The text 422a informs the user that the siren is sounding, and the button 424a allows the user to stop the siren. If the user presses the button 424a, the siren stops sounding, and the application switches to the screen 430a, wherein the frame 431a is updated with newer images from the image sensor, and the text 432a informs the user that the siren stopped sounding.

FIG. 4b displays a second example of a display of a user application in an embodiment of the invention.

In this example, a child of the user enters the house with a friend. The friend, who has not been previously identified by the device of the invention, enters first the field of view of the image sensor, then the child enters the field of view of the image sensor. When the friend enters the field of view of the image sensor, the device of the invention detects an unknown face, makes the siren emit a delay warning sound, sends a notification to the user device and streams in real time video from the image sensor. The application of the user device first displays the screen 410b that indicates 411b that a human has been detected, and 412b that the siren delay warning is sounding.

In this embodiment, the detection of any known person allows deactivating the alarm. In other embodiments of the invention, only the detection of certain known persons (for example, adults) automatically deactivates the alarm. In yet other embodiments of the invention, the alarm may be deactivated based on a combination of the detected known person, and characteristics of the unknown human. For example, when detecting a unknown human, the processing logic may be configured to determine characteristics of the unknown human, for example estimating the age of the unknown human. Thus, the activation or deactivation of the alarm can be adapted to these characteristics. For example, if an unknown human and a known child are detected, the alarm may be deactivated if the unknown human is detected as also being a child, and activated if the unknown human is detected as being an adult. Moreover, in cases wherein a child is detected as being accompanied by an unknown adult, or more generally an unknown user.

When the siren starts sounding, the screen 420b is displayed, that indicates 422b that the siren is sounding.

When the child enters the field of view of the image sensor, the device of the invention automatically detects a known face. It then stops the siren sounding, and sends an additional notification to the user device. The application displays the screen 430b, which indicates 431b that the child has been detected, and 432b that the siren was sounding and is now stopped.

In addition, the screens 410b, 420b and 403b further display the first image wherein the unknown face has been detected and, if the user clicks on the button 413, he/she can view in real time a video stream from the image sensor.

FIG. 4c displays a third example of a display of a user application in an embodiment of the invention.

In this example, the device of the invention is used simultaneously by a plurality of users. The image sensor is placed in a room of a house wherein a child of the users plays. The screens 410c, 420c, 430c and 440c display 4 successive screens in an application executed on a computing device of one of the users. At any time, the user can view in real time a video stream from the image sensor, by clicking on a button 411c, 421c, 431c and 441c.

The child "Lily" is automatically detected by the device of the invention, and a corresponding notification is sent to the user, which is for example displayed 412c, 422c, 432c, 442c by the application. The screens 410c, 420c, 430c and 440c respectively display that the siren has stopped on timer 413c, the siren was stopped by another user 423c, the siren was stopped during the entry delay 433c, and the siren has been manually triggered 443c.

Figure 5:
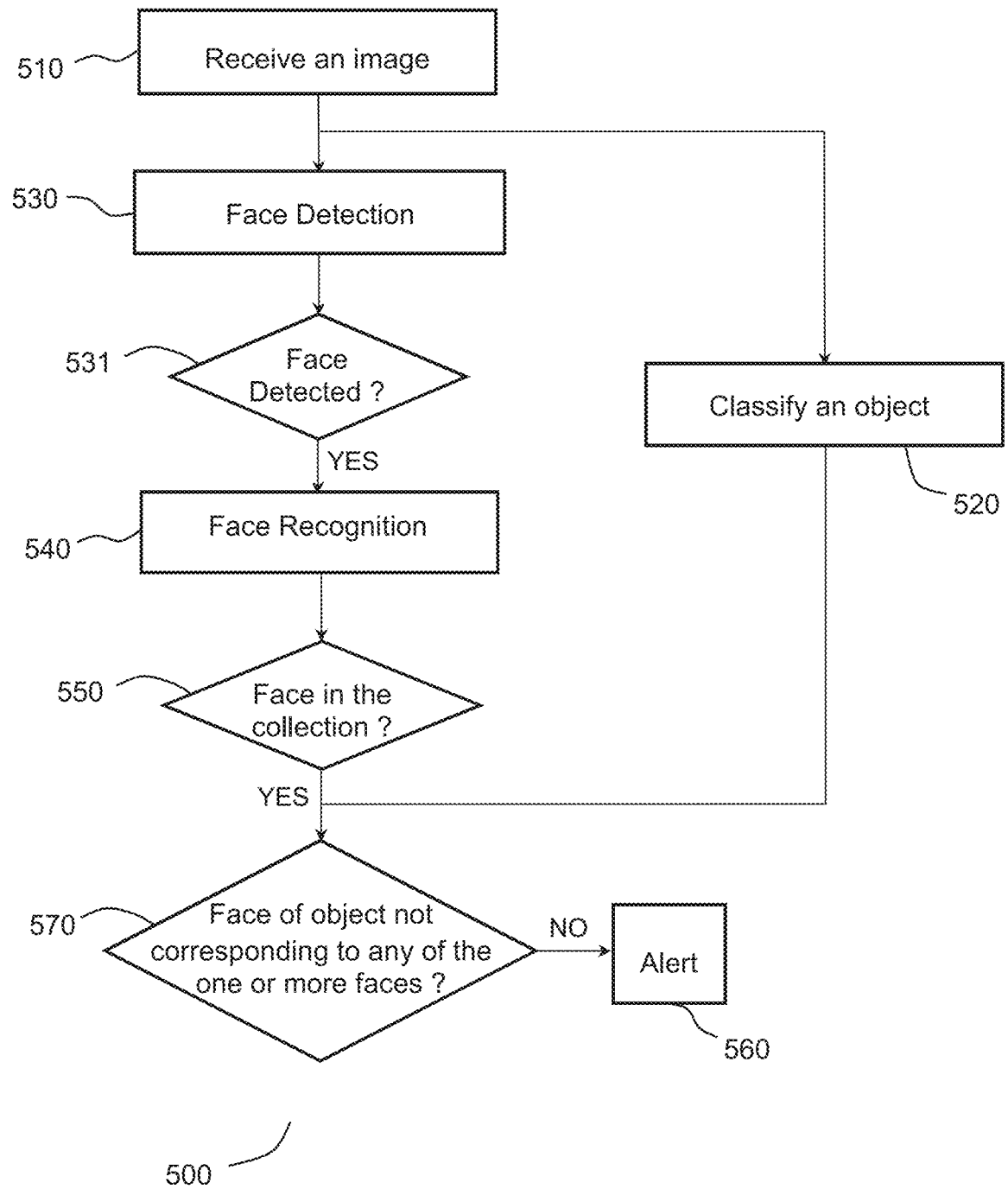
FIG. 5 displays an example of a method in a number of embodiments of the invention.

FIG. 5 displays an example of a method in a number of embodiments of the invention.

The method 500 comprises a first step of receiving an image 510 from an image sensor.

The method 500 comprises a second step 520 of classifying one or more objects in the image, in a set of classes of objects comprising a human class.

The method 500 comprises a third step 530 of detecting one or more faces in the image.

The method 500 comprises a fourth step 540 of performing face recognition of the one or more faces.

The method 500 comprises a fifth step 550 of verifying if said one or more faces belong to the first collection of faces.

The method 500 comprises verifying 570 if a face in the one or more faces, or an object in the one or more objects belonging to the human class does not correspond to any of the one or more faces, and comprises a sixth step 560 of triggering an alert event if a face in the one or more faces, or an object in the one or more objects belonging to the human class does not correspond to any of the one or more faces.

All the embodiments discussed with reference to FIGS. 1 to 4c are respectively applicable to the method 500.

The examples described above are given as non limitative illustrations of embodiments of the invention. They do not in any way limit the scope of the invention which is defined by the following claims. Moreover, all non-exclusive embodiments discussed above can be combined. For example, a processing logic of the camera 110a or the one or more servers 110b can be configured to execute any of the configurations 300a, 300b and 300c; the device 200a may be configured to make an alarm sound or call the police upon the occurrence of an alert event; the application displayed in FIGS. 4a to 4c may be used to receive alerts from a processing logic executing any of the configurations 300a, 300b and 300c; the embodiments relative to motion detection 311, face detection 330, face recognition 340, verification if a face is in the first collection 350, object classification 320, or alert events 360, 361 discussed with reference to configuration 300a can be applied to the configurations 300b and 300c.

The invention claimed is:

1. A device comprising:
   a communication link to an image sensor;
   a communication link to a memory storing face recognition data for a first collection of faces;
   a processing logic comprising adaptations to:
   receive an image from the image sensor;
   detect motion regions in the image;
   detect one or more faces in the image;
   perform a face recognition of the one or more faces in said motion regions;
   verify if there is at least one motion region wherein no face is detected;
   classify one or more objects in a set of classes of objects comprising a human class only in motion regions wherein no face is detected;
   verify if said one or more faces are included in the first collection of faces;
   trigger an alert event if a face in the one or more faces is not included in the first collection of faces;
   trigger an alert event if the one or more objects is classified as belonging to the human class.

2. The device of claim 1, wherein:
   said adaptation to receive an image comprises an adaptation to receive a series of successive images of a field of view from the image sensor, said image belonging to said series of successive images;
   said adaptation to classify one or more objects comprises adaptations to:
   calculate pixel differences between the image and an immediately preceding image in the series; and
   detect motion regions in the image based on said pixel differences.

3. The device of claim 1, wherein said adaptation to detect one or more faces in the image comprises an adaptation to define a size of a face detection region based on a size of one of said motion regions and a predefined ratio between a face and a height of a human.

4. The device of claim 1, wherein:
said adaptation to detect one or more faces in the image comprises an adaptation to determine respective positions of the one or more faces;
said adaptation to classify one or more objects in the image comprises adaptations to determine respective positions of objects belonging to the human class.

5. The device of claim 1, wherein said adaptation to perform the face recognition comprises an adaptation to perform the face recognition of the one or more faces using a neural network trained for face recognition.

6. The device of claim 5, wherein the neural network is trained for face recognition and the first collection of faces is built using images of faces labeled by a user of the device.

7. The device of claim 1, wherein said adaptation to classify one or more objects in the image comprises an adaptation to classify one or more objects in the image using a neural network trained for object classification.

8. The device of claim 7, wherein:
the set of classes of objects comprises a class representative of a non human animal of a user of the device;
said adaptation to classify one or more objects in the image comprises an adaptation to classify one or more objects using a neural network trained to classify objects representative of the non human animal based on a training set of images of the non human animal;
the processing logic comprises an adaptation to trigger a specific event if an object in the one or more objects belongs to the class representative of the non human animal.

9. The device of claim 1, wherein:
the memory stores face recognition data for a second collection of faces;
the processing logic comprises adaptations to:
verify if said one or more faces belong to the second collection of faces;
trigger an alert event if a face in the one or more faces belongs to the second collection of faces.

10. The device of claim 1, wherein the processing logic is adapted not to trigger any alert event, for a predefined duration starting from a recognition of a face in the first collection of faces.

11. A method comprising:
receiving an image from an image sensor;
detecting motion regions in the image;
detecting one or more faces in the image;
performing a face recognition of the one or more faces in said motion regions;
verifying if there is at least one motion region wherein no face is detected;
classifying one or more objects in a set of classes of objects comprising a human class only in motion regions wherein no face is detected;
verifying if said one or more faces are included in the first collection of faces;
triggering an alert event if a face in the one or more faces is not included in the first collection of faces;
triggering an alert event if the one or more objects is classified as belonging to the human class.

12. A computer program product stored on a non-transitory computer storage medium comprising computer code instructions configured to:
receive an image from an image sensor;
detect motion regions in the image;
detect one or more faces in the image;
perform a face recognition of the one or more faces in said motion regions;
verify if there is at least one motion region wherein no face is detected;
classify one or more objects in a set of classes of objects comprising a human class only in motion regions wherein no face is detected;
verify if said one or more faces are included in the first collection of faces;
trigger an alert event if a face in the one or more faces is not included in the first collection of faces;
trigger an alert event if the one or more objects is classified as belonging to the human class.

* * * * *